April 21, 1964   J. LIEBERMANN   3,129,886
THERMOSTATIC AIR FLOW CONTROL DEVICE
Filed June 11, 1962

INVENTOR.
JOHN LIEBERMANN
BY
ATTORNEY

United States Patent Office 3,129,886
Patented Apr. 21, 1964

3,129,886
THERMOSTATIC AIR FLOW CONTROL DEVICE
John Liebermann, Columbus, Ohio, assignor to Ranco Incorporated, Columbus, Ohio, a corporation of Ohio
Filed June 11, 1962, Ser. No. 201,629
2 Claims. (Cl. 236—49)

This invention relates generally to the control of the flow of heated or cooled air to rooms, cold air to refrigerator compartments, and the like for tempering thereof, and more particularly to thermostatically operated control means including a gate or baffle for modulating the flow of tempering air in accordance with the temperature of air either in or leaving the room or compartment.

It is one object of this invention to provide an improved thermally operated air flow control device suitable for use in air tempered systems such as refrigerators, the device comprising a movable gate or baffle adapted to close off or modulate the flow of air from a supply duct into a compartment, and means operatively connecting the baffle to a thermally responsive power means in such a manner as to provide a large range of movement of the baffle while supplying sufficient force to position the baffle against the effect of incoming air.

As another object of this invention aims to provide an air flow control baffle device which is particularly suited to use in domestic refrigerators and which will neither be damaged nor lose its calibration even though the baffle be prevented from proper movement by accumulations of frost or the like.

Another object of the invention is the provision of a thermostatic air baffle control of the foregoing character wherein the baffle is carried on an arm which is biased into following engagement with a thermostatically positioned member, so that if the baffle carrying arm be restrained against movement with the positioning member, the latter will move independently of the baffle arm and avert any likelihood of damage or loss of calibration in the control device.

Yet another object of this invention is the provision of an improved thermostatic device for controlling tempering air flow and which can be adjusted to select a temperature within a predetermined range of temperatures, and which can be adjusted to vary the predetermined range from which temperatures can be selected.

Other objects and advantages of thermostatic air flow control devices embodying this invention will become apparent from the following detailed description of a preferred example thereof, taken in conjunction with the accompanying sheet of drawings forming a part of this specification and in which FIG. 1 is an elevational view of a control device embodying this invention shown in association with a portion of a refrigerating apparatus;

Figure 1:
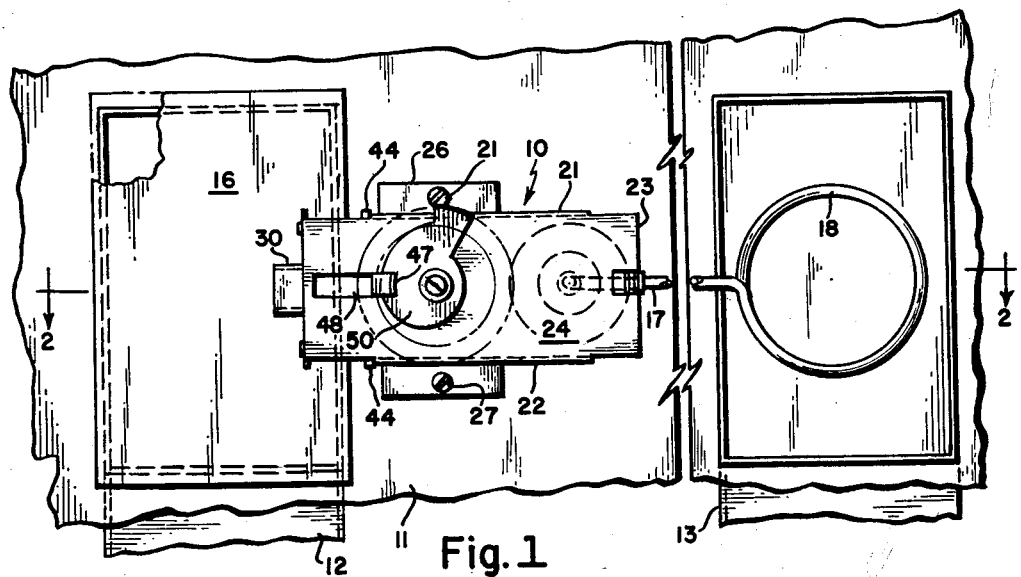

Although thermostatic control devices embodying this invention may be used to advantage in controlling air flow in tempering systems such as in the heating and cooling of rooms or buildings, the invention will be described hereinafter with reference to use in a domestic refrigerator of the type disclosed in co-pending application Serial No. 193,701, filed May 10, 1962, which is assigned to the assignee of this invention and to which reference may be had for a more complete description of the type of refrigerator concerned. Suffice it to say, however, that the refrigerator comprises duct means for conveying cold air from a cooling unit to a food compartment and for returning air from the compartment to the cooling unit.

In the form of the invention shown in the drawings, there is provided a thermostatic control device 10 which is supported on the inner surface of a vertical wall 11 which defines a food compartment. The food compartment is served by an inlet duct 12 through which cold air enters the compartment, and an outlet duct 13 through which air leaves the compartment for return to the cooling means. The amount of air entering the compartment through supply duct 12, and hence the temperature in the compartment, is regulated by an air gate or baffle 16 forming part of the thermostatically operated control device 10 secured to compartment wall 11. The control device 10 includes means for positioning baffle 16 in accordance with changes in temperature of the air in the compartment as sensed by a temperature sensing capillary tube 17 terminating in a coiled end 18 disposed in the outlet opening leading to return duct 13.

Figure 2:
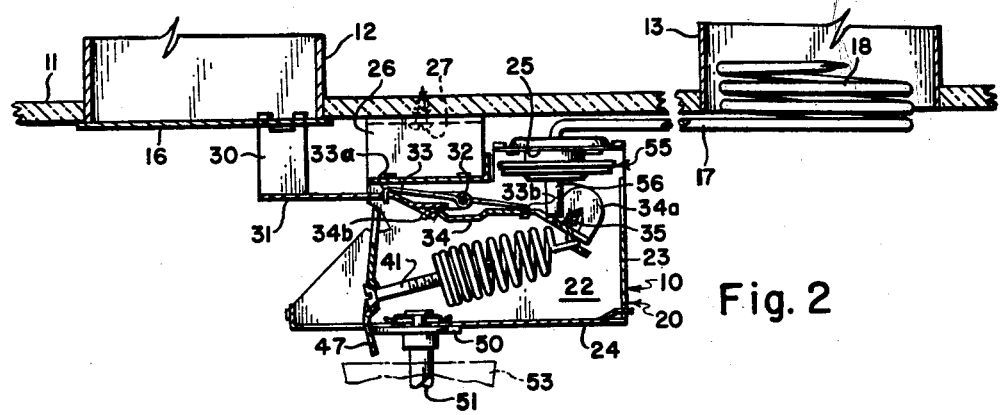
FIG. 2 is a sectional view taken along line 2—2 of FIG. 1.
Figure 3:
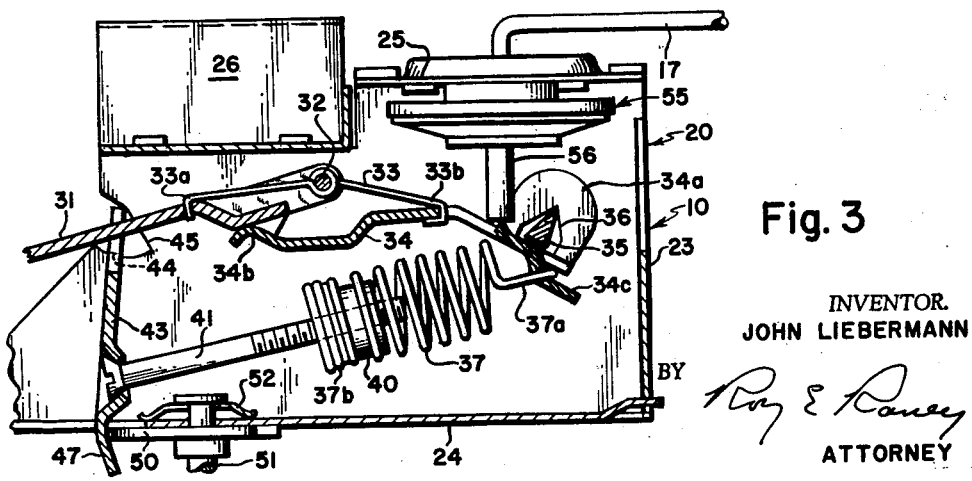
FIG. 3 is an enlarged fragmentary sectional view of the control device but showing parts in different operative positions.

Referring more particularly now to FIGS. 2 and 3, control device 10 comprises a frame in the form of a box-like sheet metal housing 20 having a pair of parallel walls 20 and 22 joined by an end wall 23, a removable cover wall 24, and a partial wall 25 opposite cover wall 24. The device 10 is mounted by bracket means 26 secured by screws 27 to the food compartment wall 11.

Baffle 16 is supported on spaced leg portion 30 at one end of a stamped, sheet metal baffle arm 31, the other end of which is bifurcated and extends into housing 20 where it is pivoted between side walls 21 and 22 by a pivot pin 32. Arm 31 is biased in a counterclockwise direction, as viewed in the drawings, by a wire spring 33 which is coiled about pivot pin 32 and has one end 33a engaging arm 31 and has its other end 33b engaging a lever 34.

Lever 34, which is preferably a sheet metal stamping, has spaced bearing portions 34a and is pivotally mounted between side walls 21 and 22 by a triangular fulcrum pin 35 extending through openings 36 in the spaced bearing portions. The other end of lever 34 engages the baffle arm 31 between pivot pin 32 and the outer end of the arm. Lever 34 is biased in a clockwise direction about pivot pin 35 by a range adjusting tension spring 37 which has one end 37a hooked on a projection 34c of lever 34 and has its other end 37b connected to the housing by adjustable anchoring means.

The adjustable anchoring means comprises a nut member 40 lodged in the convolutions of spring end 37b and threadedly engaged on a range adjusting screw 41 extending through an opening in a lever 43. Lever 43 has laterally extending tabs 44, the upper edges of which are engaged in V-shaped notches 45 in the side walls 21 and 22 to provide pivotal support for the lever. Lever 43 comprises a cam follower portion 47 extending through a slot 48 in cover wall 24 and engaging the periphery of a temperature selecting cam 50. Cam 50 is secured to a shaft 51 which is journaled in an opening in cover 24, and is conveniently retained therein by a spring clip 52 disposed in a groove in the shaft and bearing against the inner side of the cover. Shaft 51 may be provided with a knob 53 for permitting manual rotation of the cam 50 to adjustably position lever 43 so as to adjust the tension of range spring 37 tending to rotate lever 34 in a clockwise direction about pin 35.

Clockwise movement of lever 34 about the pin 35 under the influence of spring 37 is opposed by expansible power means including a metallic hollow element or wafer 55 formed of two dish shaped diaphragms having the concave surfaces thereof facing one another and hermetically sealed about their edges, and which wafer is connected to the temperature sensing capillary tube 17. The wafer 55 and tube 17 contain a volatile fluid, the vapor pressure of which increases and decreases with increases and decreases in temperature experienced at the coolest portion of the tube 17. This assembly provides an expansible power means of a type well known in the art. The wafer 55 is mounted on wall 25 and has an axially extending post 56 bearing against a knife edge 57 of lever 34, as shown.

Assuming the refrigerator compartment to be below a predetermined temperature such as 40° F., the components of device 10 will be positioned as shown in FIGS. 1 and 2 wherein wafer 55 is in a contracted condition and spring 37 acts through lever 34 and baffle arm 31 to hold baffle 16 in closing relation to the inlet opening of supply duct 12 against the biasing action of spring 33. At this point it should be noted that the biasing effect of spring 37 is greater than that of spring 33. As the temperature in the compartment rises above 40° F., the wafer 55 expands causing post 56 to rotate lever 34 in a counterclockwise direction against the biasing effect of spring 37. Upon such counterclockwise movement of lever 34, baffle arm 31 is caused by spring 33 to follow the movement of lever end 34b, as shown in FIG. 3, and hence to move baffle 16 away from the opening of supply duct 12 so as to admit cold air into the compartment.

As the temperature of the air entering return air duct 13 falls, wafer 55 contracts allowing spring 37 to act through lever 34 and arm 31 to move baffle 16 toward its supply duct closing position. The biasing effect of spring 37 provides the load against which wafer 55 operates and hence determines the temperature at which baffle 16 will begin to open and will close. This temperature may be selected, within a given range of temperatures, by rotating shaft 51 and cam 50 so as to position lever 43 to vary the tension on spring 37. The range of temperatures within which rotation of shaft 51 and cam 50 operate may be varied by adjustment of range screw 41 in nut member 40.

The relationship between arm 31, lever 34, and wafer post 56 provides a substantial multiplication of motion between the wafer and the end 30 of arm 31 carrying baffle 16. Also, because arm 31 is simply caused to follow lever end 34b by spring 33, lever end 34b is free to move away from arm 31 in the event baffle 16 is prevented from moving away from the opening of supply duct 12, by frost for example. This arrangement removes any likelihood of damage or distortion to the control device. Likewise, if the baffle is held by some interfering force in an open position, contraction of water 55 will simply cause post 56 to move away from bearing edge 57 of lever 34 until the interference is removed.

From the foregoing detailed description of a presently preferred embodiment of the invention, it will be recognized that there has been provided thereby a particularly effective thermally responsive air flow control means for thermostatically regulating the flow of tempering air to rooms or compartments. It will also be recognized that the improved control device embodying this invention is characterized by the construction and arrangements of parts which preclude any likelihood of damage to the device or loss of calibration thereof should the baffle member be inadvertently prevented from moving in accordance with temperature changes.

Although the present invention has been described in considerable detail with specific reference to a particular control device embodying the invention, it will be understood that the invention is not limited thereby, but rather the invention includes all those modifications, adaptations, substitutions, and uses, as are reasonably embraced by the scope of the claims hereof.

Having thus described my invention, I claim:

1. A device for controlling flow of tempering air in accordance with temperatures in a space to be tempered, said device comprising:
   (a) a housing having side walls,
   (b) a lever pivoted between said side walls for movement about a first axis, said lever having a free end,
   (c) a thermally expansible power element mounted on said housing and engageable by said lever,
   (d) a first spring urging said lever about said first axis for following engagement with said power element,
   (e) an arm extending from said housing and having one end pivoted between said walls for movement of said arm about a second axis, one end of said arm being engageable with said free end of said lever,
   (f) an air baffle mounted at the other end of said arm for movement therewith,
   (g) a second spring urging said arm about said second axis for following engagement with said free end of said lever,
   (h) said lever being movable away from said arm by by said power element when said baffle is restrained against movement in one direction, and said power element being movable away from said lever when said baffle is restrained against movement in the opposite direction.

2. A device for controlling flow of tempering air in accordance with temperatures in a space to be tempered, said device comprising:
   (a) a housing having side walls,
   (b) an arm extending from said housing and having one end pivoted between said side walls,
   (c) an air baffle mounted on the other end of said arm for movement therewith,
   (d) first spring means contacting said arm and urging said arm and baffle away from one operative position,
   (e) a thermally expansible power element mounted on said housing,
   (f) lever means between said power element and arm for limiting movement of said arm by said first spring means, and
   (g) a second biasing means urging said lever means toward said power element and adapted to overpower the first spring means,
   (h) said power element being operative in response to temperature changes to move said lever to permit movement of said arm and baffle away from said one position by said first spring means in accordance with the temperatures experienced,
   (i) said lever means being movable by said second power element away from engagement with said arm when the baffle is impeded in movement in the other direction.

References Cited in the file of this patent
UNITED STATES PATENTS

| | | |
|---|---|---|
| 2,203,057 | Moore | June 4, 1940 |
| 2,625,017 | Tucker | Jan. 13, 1953 |
| 2,712,731 | Dills | July 12, 1955 |

FOREIGN PATENTS

| | | |
|---|---|---|
| 71,856 | Germany | Feb. 2, 1893 |